(12) United States Patent
Churchill, III et al.

(10) Patent No.: US 7,156,087 B1
(45) Date of Patent: Jan. 2, 2007

(54) OUTDOOR MULTI-METHOD COOKER

(76) Inventors: Albert B. Churchill, III, 301 Wild Plum, League City, TX (US) 77573; Robert S. Churchill, 2507 Calder Dr., League City, TX (US) 77573

( * ) Notice: Subject to any disclaimer, the term of this patent is extended or adjusted under 35 U.S.C. 154(b) by 133 days.

(21) Appl. No.: 10/858,087

(22) Filed: May 31, 2004

(51) Int. Cl.
*A47J 37/00* (2006.01)

(52) U.S. Cl. ..................................... 126/25 R; 126/33
(58) Field of Classification Search .............. 126/25 R, 126/41 R, 50, 80, 82, 104 R, 211, 215, 216, 126/217, 505, 506, 307 R, 276
See application file for complete search history.

(56) References Cited

U.S. PATENT DOCUMENTS

| | | | |
|---|---|---|---|
| 1,244,489 A | 10/1917 | Gunn | |
| 1,328,971 A | 1/1920 | Baldwin | |
| 1,422,603 A | 7/1922 | Morrison | |
| 3,568,590 A * | 3/1971 | Grice | 99/446 |
| 3,696,803 A * | 10/1972 | Holloway, Jr. | 126/276 |
| 4,076,008 A | 2/1978 | Deaton | |
| 4,418,615 A | 12/1983 | Higgins | |
| 4,664,026 A * | 5/1987 | Milloy | 99/352 |
| 4,700,618 A | 10/1987 | Cox, Jr. | |
| 4,791,909 A | 12/1988 | Kalthoff | |
| 5,000,085 A | 3/1991 | Archer | |
| 5,381,729 A * | 1/1995 | Hennessy et al. | 99/483 |
| 5,992,406 A * | 11/1999 | Lelle | 126/33 |
| 5,996,572 A | 12/1999 | Hagan | |
| 6,651,646 B1 | 11/2003 | Lloyd et al. | |

* cited by examiner

*Primary Examiner*—Cheryl Tyler
*Assistant Examiner*—Michael J. Early
(74) *Attorney, Agent, or Firm*—Kenneth A. Robby

(57) ABSTRACT

An outdoor multi-method cooker for preparing a wide variety of different foods at the same time using selective convection, radiant, or conduction cooking operations with or without smoke, or combinations thereof, using a single heat source. The cooker has a horizontal central longitudinal chamber with a firebox at one end and a pair of stacks at the opposed end, a main oven, a pair of lateral smokeless ovens, a warming compartment, and a griddle above the firebox, all disposed transversely on the longitudinal chamber in parallel spaced relation, and a steam table along the upper portion of the longitudinal chamber. The cooker operates on the principle of equalization of natural differential pressures caused by rising warmer air, similar to the draw created by the upper portion of a fireplace, for drafting hot gases or smoke laden hot gases from the combustion source and selectively routing it through passageways into and around the various components.

12 Claims, 5 Drawing Sheets

OUTDOOR MULTI-METHOD COOKER

BACKGROUND OF THE INVENTION

1. Field of the Invention

This invention relates generally to outdoor kitchens and cookers, and more particularly to an outdoor multi-method cooker for preparing a wide variety of different foods at the same time using selective convection, radiant, or conduction cooking operations with or without smoke, or combinations thereof, using a single heat source.

2. Background Art

Mobile outdoor kitchens and cookers for cooking different foods at the same time are known in the art. In the early 1900's wheeled "rolling military kitchens" or "Field Kitchens" such as disclosed in Gunn, U.S. Pat. No. 1,244,489, Baldwin, U.S. Pat. No. 1,328,071 and Morrison, U.S. Pat. No. 1,422,603, were developed for feeding army troops.

Barbecue grills have become increasingly popular in recent years because of the interest in outdoor cooking. Conventional charcoal grills utilize a quantity of charcoal placed in the lower portion of the grill with a cooking grid supported at the upper portion. The charcoal serves as the heat-producing means for the food being cooked. Conventional gas grills include a burner assembly adjacent the lower portion of a firebox with a cooking grid supported along the upper edge and lava rock located between the cooking grid and the burner assembly. The lava rock absorbs the heat from the burning gas and provides a generally uniform heat-producing means for the food being cooked. Cooker/smoker type outdoor grills and ovens have also become increasingly popular for cooking of meat and other assorted food in an outdoor setting wherein the food can be roasted over a grill and cooked by the heat from hardwood or charcoal briquettes burning under the grill.

However, a common problem with these types of cookers and grills is that grease, sauce and drippings from the food being cooked and other combustible particles fall directly into the charcoal, lava rock, or fire, causing flare ups and hot spots within the grilling chamber and irregularities in cooking temperatures which can result in charring and burning of the food.

Some cooking apparatus have been developed which avoid the difficulties discussed above by conducting the hot gases from a hardwood fire into a cooking chamber where it is circulated before being exhausted, and collecting the excess renderings and drippings in pans disposed below the meat.

Deaton, U.S. Pat. No. 4,076,008 discloses a barbeque oven wherein meat is suspended on a perforated food rack within an enclosed, heat retaining housing, and heat and smoke from a firebox adjacent one end of the housing is directed along the length of the housing within a tempering passageway and then up, around the meat, and along the length of the housing in the opposite direction to an exit flue fixed to the top of the housing adjacent said end of the housing. A baffle divides the housing into upper and lower portions for directing the above-described flow of smoke and heat, and insulation located intermediate the food rack and the opening connecting the firebox and the lower portion of the housing prevents direct radiation from the firebox from striking meat on the food rack. Warming closets with a flue for controlling the temperature within said warming closets are provided adjacent said end of the housing above the firebox.

Cox, Jr., U.S. Pat. No. 4,700,618 discloses a portable meat smoker cooking unit having a fire box and a smoker oven vertically and laterally offset from the fire box. The smoker oven has an upper enclosed volume containing meat to be cooked and a lower enclosed volume which opens directly to the fire box. The upper and lower volumes are separated by a hot pan drain wall. An adjustable damper is provided between the upper volume and the fire box to control the temperature and the smoke density within the upper volume. A top having a heating plate may be placed over an opening in the fire box to define an oven volume for radiant heat input.

Some cooker and grills use heat transfer through radiation together with convection heating from the circulating air and conduction heating through the grill's surface to perfect the carmelization process. Many of these types of grills do not adequately allow a means for regulating the intensity of heat needed to properly grill various foods. Reducing the temperature of the heat source can diminish the effect of radiation heat transfer and leave only relatively inefficient convection heating to cook the food. Air blowers and plenum chambers have also been used to force air past the heat source to improve heat transfer efficiency, however, with many of these types of cookers, after the air is forced past the food product it is exhausted to the atmosphere and no longer redistributed within the apparatus to aid in the grilling process or for other cooking operations. The achievement of uniformly cooked meat and the efficient use of fuel and energy are some continual problems associated with the operation of outdoor cookers and grills.

Higgins, U.S. Pat. No. 4,418,615 discloses a convection barbecue pit wherein heated smoke from a firebox passes through a flue into a cooking chamber, which has a discharge duct and fan in the ceiling thereof to draw the smoke entering the cooking chamber through a suction port to exhaust the smoke lade gases. The flue may be set to exhaust smoke around the cooking chamber when the pit is in an evacuation mode.

Kalthoff, U.S. Pat. No. 4,791,909 discloses a smoker oven for cooking and smoking food including a housing with an uppermost and lowermost cooking chamber. Hot, smoke laden air is produced and circulated inside the housing, and means are provided for directing the flow of circulating air horizontally through each chamber, passing the air through the uppermost and lowermost chambers in essentially opposite horizontal directions. Means for baffling and diffusing the airflow into each cooking chamber provide uniformly distributed horizontal airflow through each cooking member.

Archer, U.S. Pat. No. 5,000,085 discloses an air slot cooking grill which recirculates its hot air for grilling foods. The cooking device is formed from an enclosure having a bottom, side walls and a removable top. A housing abuts a side wall of the enclosure and communicates fluidly with a chamber through an air flow opening. A blower located within the housing chamber recirculates air throughout the enclosure. A jet curtain plate containing various slot widths is mounted in the heat supplying space of the enclosure and spaced apart and above the heat supplying element. The slots yield streams of air having different velocities at different areas of the jet curtain plate such that certain areas of the grill have various cooking speeds. After the hot air heats the food on the grill, the air flows rearwardly and downwardly into a return plenum and the heated air is drawn by a fan impeller horizontally into the heating plenum where it traverses and absorbs heat from the heating element. To complete its recirculating path, the heated air is then directed to the air slot openings in the jet curtain plate and redirected back to the grill. Although this patent recirculates hot air within the enclosure of the barbecue, it is only adapted for a heating element and not for wood or charcoal.

Ilagan, U.S. Pat. No. 5,996,572 discloses a turbo-charcoal barbeque having a detachable turbo unit, an adjustable rotisserie ensemble, a moveable charcoal tray, removable ash trays, and a fire screen. The turbo unit is positioned to recirculate hot air from underneath the charcoal tray and redistribute the hot air to the upper and lower areas of the grill. The turbo unit and rotisserie are driven by a 12 volt motor or from an electrical outlet using a transformer.

Lloyd et al, U.S. Pat. No. 6,651,646 discloses a barbecue grill having a heating compartment and a plenum chamber disposed proximate to the heating compartment. The plenum chamber has a central vent for providing access to the central portion of the heating compartment and a pair of opposed side vents to provide access to the two opposed side portions of the heating compartment. A recirculation fan is disposed proximate to the central vent. The recirculation fan is adapted to draw hot gases from the central portion of the heating compartment into the plenum and drive those gases via the plenum into the side portions of the heating compartment via the pair of opposed side vents.

The present invention is distinguished over the prior art in general, and these patents in particular by an outdoor multi-method cooker for preparing a wide variety of different foods at the same time using selective convection, radiant, or conduction cooking operations with or without smoke, or combinations thereof, using a single heat source. The cooker has a horizontal central longitudinal chamber with a firebox at one end and a pair of stacks at the opposed end, a main oven, a pair of lateral smokeless ovens, a warming compartment, and a griddle above the firebox, all disposed transversely on the longitudinal chamber in parallel spaced relation, and a steam table along the upper portion of the longitudinal chamber. The cooker operates on the principle of equalization of natural differential pressures caused by rising warmer air, similar to the draw created by the upper portion of a fireplace, for drafting hot gases or smoke laden hot gases from the combustion source and selectively routing it through passageways into and around the various components.

SUMMARY OF THE INVENTION

It is therefore an object of the present invention to provide an outdoor multi-method cooker capable of preparing a wide variety of different foods at the same time using selective convection, radiant, or conduction cooking operations with or without smoke, or combinations thereof, using a single heat source.

It is another object of this invention to provide an outdoor multi-method cooker that operates on the principle of equalization of natural differential pressures caused by rising warmer air, similar to the draw created by the upper portion of a fireplace, for drafting hot gases or smoke laden hot gases from a combustion source and selectively routing it through various passageways into and around the various cooking chambers.

Another object of this invention is to provide an outdoor multi-method cooker having a main oven, a pair of lateral smokeless ovens, a warming compartment, a griddle and a steam table which can all be utilized at the same time.

Another object of this invention is to provide an outdoor multi-method cooker having a main oven wherein hot gases with or without smoke enters from either end and is caused to swirl about its longitudinal axis and toward the center to creates a substantially even distribution of heat within the oven and food therein is cooked both by convection heat as the swirling hot gases or smoke laden hot gases pass over and around the food, and by radiant heat.

Another object of this invention is to provide an outdoor multi-method cooker having a main oven wherein the temperature in lateral end portions can be selectively adjusted to cook different food items requiring different temperatures at the same time without having to move or relocate the items.

Another object of this invention is to provide an outdoor multi-method cooker having a pair of smokeless ovens wherein the temperature in each can be selectively adjusted to cook different food items requiring different temperatures at the same time without having to move or relocate the items and food therein is cooked by smokeless radiant heat.

Another object of this invention is to provide an outdoor multi-method cooker having a griddle located just above a firebox that may be used for cooking food and containerized liquid items by conductive heat transfer, and while cooking other food items in other compartments by selective radiant, or conduction cooking operations with or without smoke, or combinations thereof.

A further object of this invention is to provide an outdoor multi-method cooker having a steam table that can be used to keep cooked food warm until served, and can be used to serve warm food cafeteria style.

A still further object of this invention is to provide an outdoor multi-method cooker having a warming compartment that can be used to keep cooked food warm until served, and for maintaining liquid products in a warm condition.

Other objects of the invention will become apparent from time to time throughout the specification and claims as hereinafter related.

The above noted objects and other objects of the invention are accomplished by an outdoor multi-method cooker for preparing a wide variety of different foods at the same time using selective convection, radiant, or conduction cooking operations with or without smoke, or combinations thereof, using a single heat source. The cooker has a horizontal central longitudinal chamber with a firebox at one end and a pair of stacks at the opposed end, a main oven, a pair of lateral smokeless ovens, a warming compartment, and a griddle above the firebox, all disposed transversely on the longitudinal chamber in parallel spaced relation, and a steam table along the upper portion of the longitudinal chamber. The cooker operates on the principle of equalization of natural differential pressures caused by rising warmer air, similar to the draw created by the upper portion of a fireplace, for drafting hot gases or smoke laden hot gases from the combustion source and selectively routing it through passageways into and around the various components.

DESCRIPTION OF THE PREFERRED EMBODIMENT

Figure 1:
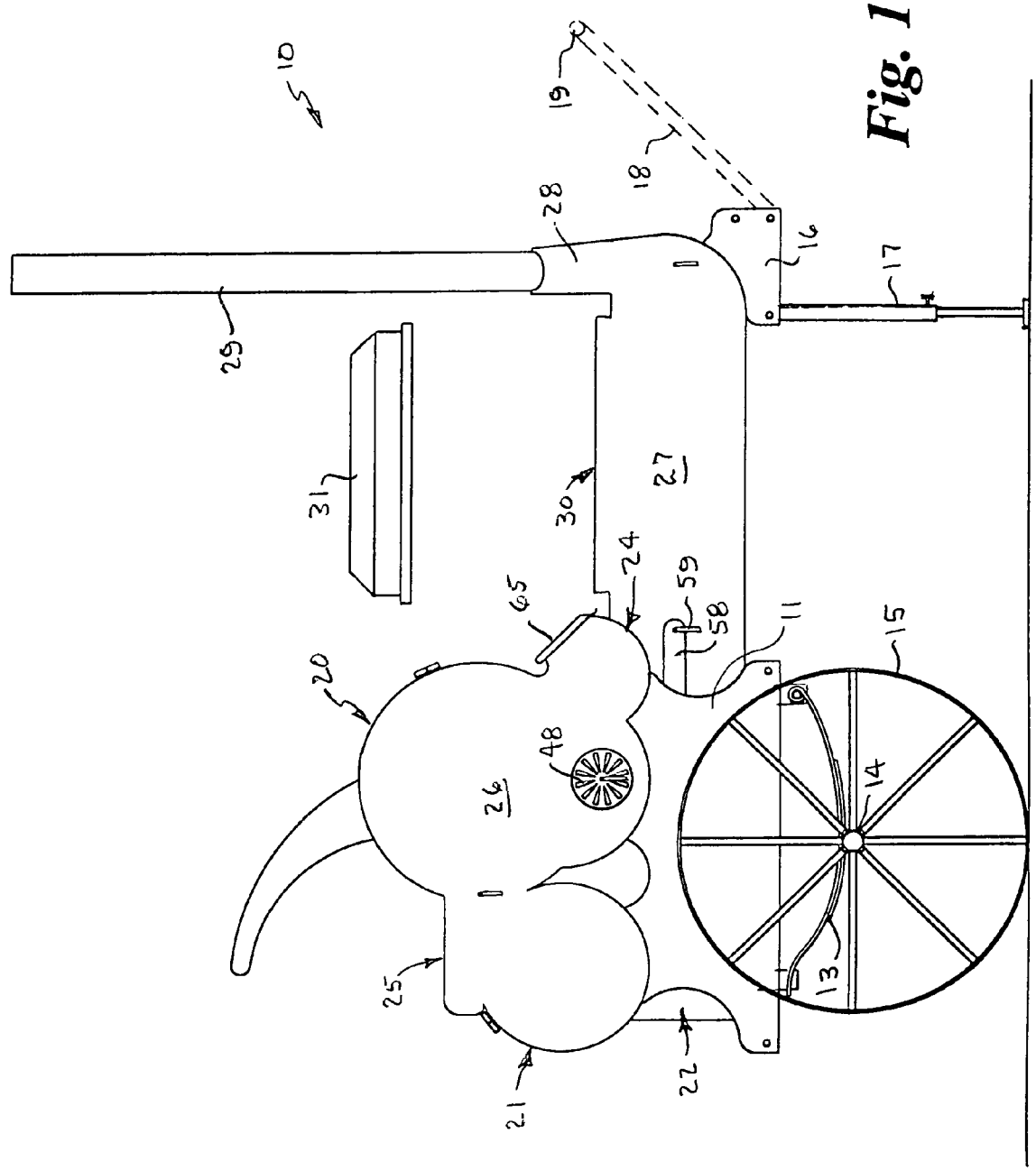
FIG. 1 is a side elevation of the outdoor multi-method cooker in accordance with the present invention.
Figure 2:
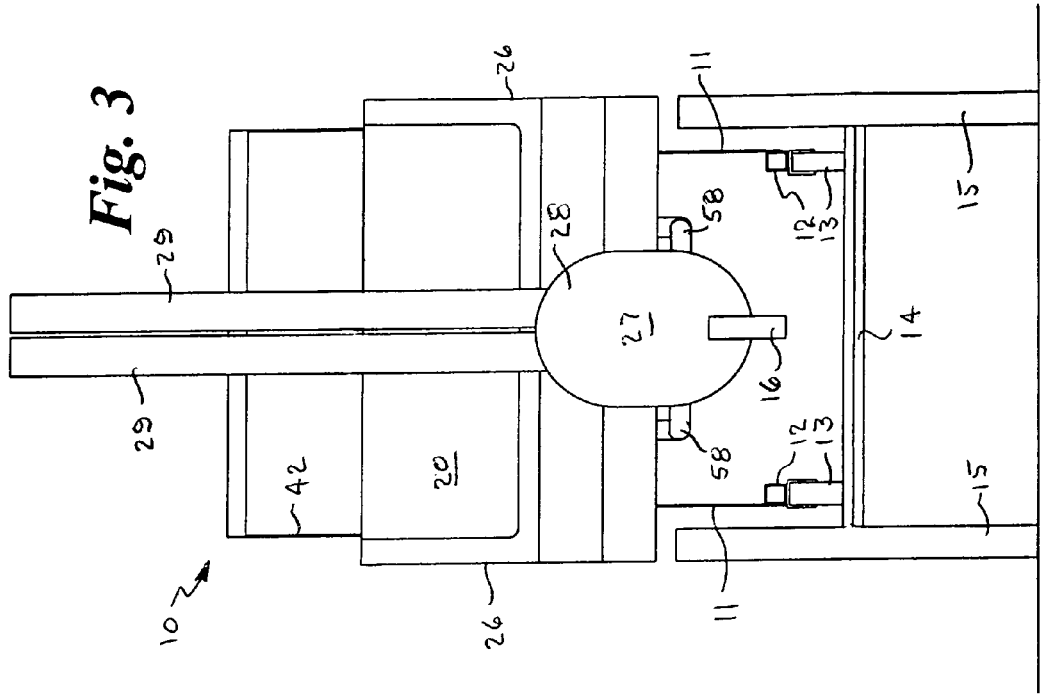
FIG. 2 is a front elevation view of the outdoor multi-method cooker.
Figure 3:
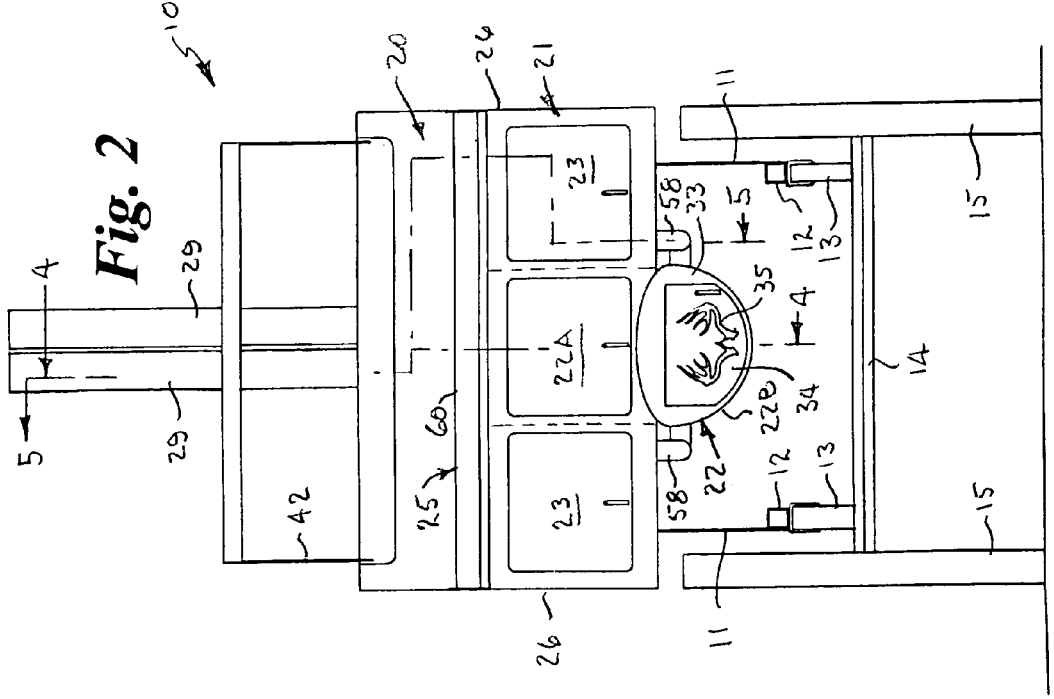
FIG. 3 is a rear elevation view of the outdoor multi-method cooker.

Referring to the drawings by numerals of reference, there is shown in FIGS. 1–3, a preferred outdoor multi-method cooker 10. In the following discussion, the terms forward or front refer to the direction or end of the cooker shown on the right-hand side of the figure as seen in FIG. 1. The terms rearward or rear refer to the direction or end of the cooker shown on the left-hand side of the figure as seen in FIG. 1.

The present cooker may utilize wood, charcoal, or charcoal and wood chips as the fuel source. Wood produces smoke, and charcoal alone produces some small amount of smoke, but much less than wood. In the following discussion, it should be understood that the phrase "smoke laden hot gases" is used to describe the products of combustion using wood, or charcoal with wood chips, as the fuel source, and "hot gases" is used to describe the products of combustion using only charcoal or a source that produces very little or no smoke.

The components of the cooker 10 are constructed of metal, such as stainless steel, and are fitted together with passageways formed therebetween which controlled to provide selective circulation of air, smoke laden hot gas, and heat that allow foods to be cooked by different cooking methods using a single heat source (combustion of wood or charcoal). The air draft, smoke laden hot gas and heat circulating systems utilize the principle of equalization of natural differential pressures caused by rising warmer air, similar to the draw created in the upper portion of a fireplace, for drafting heat, hot gases or smoke laden hot gases from the combustion source and routing them in and around the various cooking chambers.

The components of the cooker 10 are supported on a support frame having a pair of parallel laterally spaced support plates 11 secured to rectangular channels 12 at their lower ends. In the illustrated example, the rectangular channels 12 are supported on a leaf spring suspension 13 including an axle 14 with wheels 15 rotatably connected at each end of the axle. A bracket 16 is provided at the forward end of the cooker 10 in which a removable or collapsible stand 17, which is adjustable in height, may be installed to support the forward end of the cooker. A pivotal tongue 18 having a trailer hitch or a handle H at its outer end may also be installed in the bracket 16 for towing or manually transporting the cooker to a desired location. It should be understood, that the rectangular channels 12 of the support frame may alternatively be supported in a skid, in the bed of a conventional trailer or truck, supported on small casters, or permanently mounted on a suitable support in a desired location.

Generally described, the multi-method cooker apparatus 10 includes a main oven 20 having a side wall of curvilinear cross section, a generally cylindrical compartment 21 having a side wall of curvilinear cross section which encloses the upper end of a firebox compartment 22 and a pair of lateral smokeless ovens 23, and a generally rectangular warming compartment 24, each of which are secured to and supported transversely on the laterally spaced support plates 11 in parallel spaced relation. A generally rectangular griddle 25 is disposed horizontally above the generally cylindrical compartment 21. Each of the opposed outer ends of the main oven 20, the generally cylindrical compartment 21, the warming compartment 24, and the griddle 25 are enclosed by a common end wall 26.

An elongate horizontal central longitudinal chamber 27 having a side wall of curvilinear cross section and a rear portion disposed centrally between the parallel laterally spaced support plates 11 extends longitudinally a distance forwardly therefrom and has an expansion chamber 28 at its front end. A pair of flues or stacks 29 are joined at their lower ends in fluid communication with the expansion chamber 28 and extend vertically upward therefrom. The lower portion 22B of the firebox compartment 22 is contained within the rear portion of the longitudinal chamber 27. A generally rectangular steam table 30 is disposed horizontally along the upper portion of the central longitudinal chamber 27 between the warming compartment 24 and the expansion chamber 28, and is provided with a rectangular removable cover 31.

As explained and shown in greater detail hereinafter, the interior rear portion of the central longitudinal chamber 27 is connected to and joined in fluid communication with the lower portions of the main oven 20, and the lateral smokeless ovens 23, its mid portion is in fluid communication with the steam table 30, and its front portion is in communication with the expansion chamber 28 and stacks 29. The firebox compartment 22 is disposed between the lateral smokeless ovens 23 and connected in fluid communication with the griddle 25.

Referring now additionally to FIGS. 4–7, the components will be described in greater detail. As shown in cross section in FIGS. 4 and 7, the elongate central longitudinal chamber 27 has a side wall 32 of generally circular or oval shaped cross section and a rear end wall 33 with an access opening and a door 34 pivotally mounted thereon. The door 34 has an aperture formed therethrough to provide a primary air intake vent 35, and a latching handle 34A. In the illustrated example, the primary air vent 35 is an aperture cut out in the shape of a pair of antlers (FIG. 1). The rear portion of the side wall 32 of the longitudinal chamber 27 has an opening in its top end and a pair of laterally spaced vertical side walls 36 that extend upwardly from the curved bottom at each side of the opening which have a generally semi-circular top portion. The lateral side walls 36 divide the generally cylindrical compartment 21 into a central compartment extending between the lateral walls 36 that forms the upper portion 22A of the firebox compartment 22. The lateral side walls 36 also form the inner facing walls of the laterally spaced smokeless ovens 23 (as described hereinafter) that extend laterally outward therefrom.

As stated above, the generally cylindrical compartment 21 has a generally circular side wall 37 and is divided by the laterally spaced walls 36 into the central firebox compartment 22, and lateral smokeless oven compartments 23. The rear portion of the curved side wall of each compartment is cut out to form access openings which are each covered by a respective hinged curved door 38 and 39 having latching handles 38A and 39A.

Figure 4:
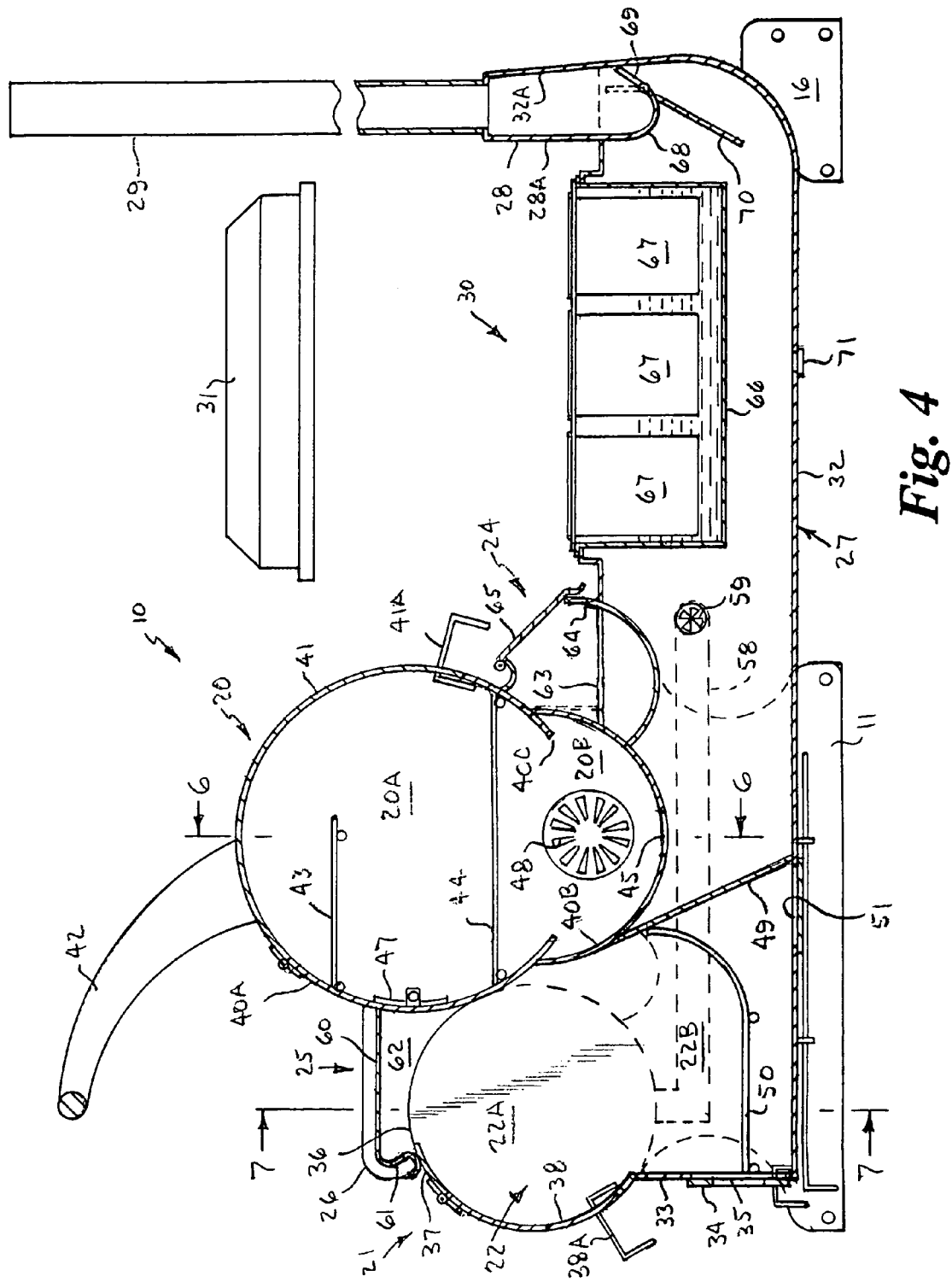
FIG. 4 is a longitudinal cross section through the center of the cooker, taken along line 4—4 of FIG. 2.
Figure 6:
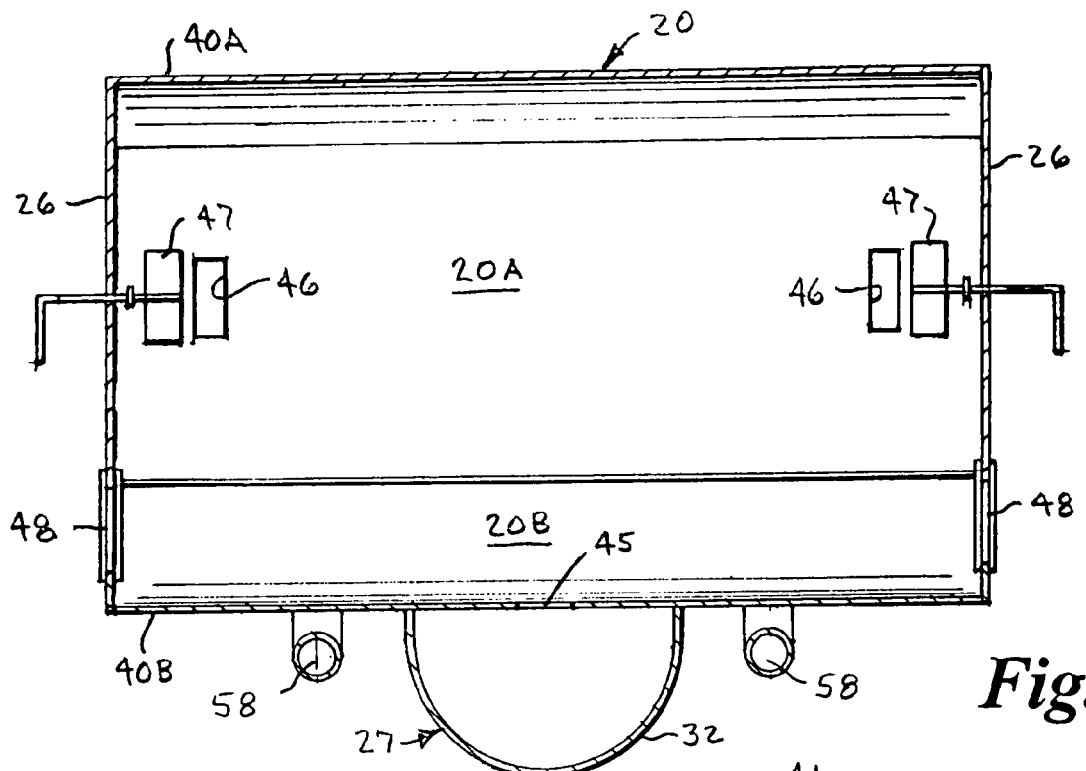
FIG. 6 is a cross section through the main cooking chamber of the cooker, taken along line 6—6 of FIG. 4, showing the laterally spaced rectangular openings and sliding dampers in interior of the main oven near its outer ends.

As shown in cross section in FIGS. 4 and 6, the side wall of the main oven 20 has a generally semi-circular or arcuate upper portion 40A of larger diameter and a generally semi-circular or arcuate lower portion 40B of smaller diameter. The upper portion side wall 40A has a front segment cut out to form an access opening that is covered by a hinged curved door 41 having a latching handle 41A, and has an open bottom segment 40C that extends substantially the length of the oven. A counterweight arm 42 extends upwardly and rearwardly from the curved door 41. The longitudinal sides of the smaller diameter lower portion side wall 40B are adjoined to the larger diameter upper portion 40A a short distance outward from the open bottom segment 40C. Thus, the interior of the main oven 20 has a larger diameter upper portion 20A and a smaller diameter lower portion 20B. The lower portion side wall 40B of the main oven 20 is secured transversely in a cut away portion in the top of the side wall 32 of the central longitudinal chamber 27, and the interior lower portion 20B of the main oven 20 is disposed in heat exchange relation with the interior of the central longitudinal chamber. An upper food rack 43 and a lower grid iron 44 are removably supported in the upper portion 20A of the main oven.

A small rectangular opening or hole 45 is formed in the bottom of the side wall 32 of the smaller diameter lower portion side wall 40B at its center and is in fluid communication with the interior of the central longitudinal chamber 27 to allow fluid flow between the lower portion 20B of the main oven 20 and the central longitudinal chamber.

Figure 7:
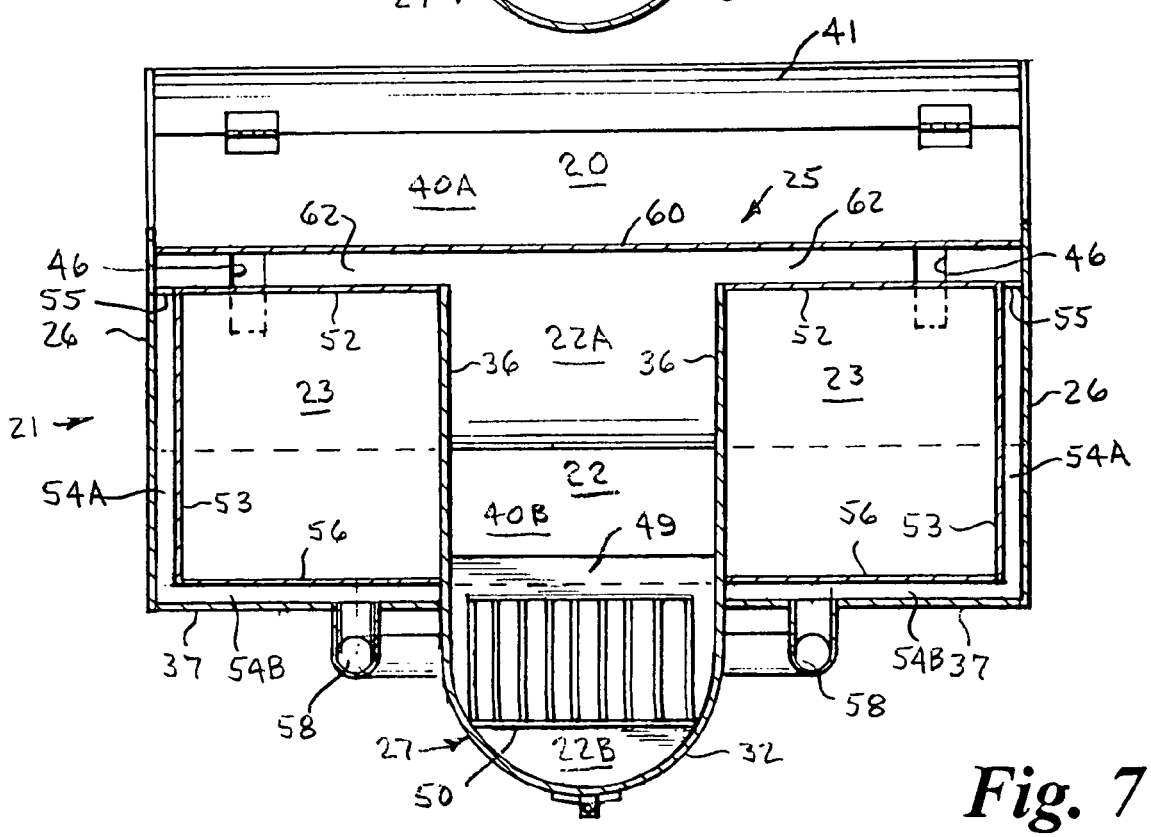
FIG. 7 is a cross section through the firebox and lateral smokeless ovens of the cooker, taken along line 7—7 of FIG. 4, showing the griddle and laterally spaced rectangular openings on the exterior of the main oven beneath the griddle.

As best seen in FIGS. 6 and 7, a pair of laterally spaced small rectangular openings 46 are formed in the upper portion side wall 40B of the main oven 20 near its outer ends, respectively, and each is selectively covered by an adjustable sliding damper 47 that controls fluid flow between the underside of the griddle 25 and the upper portion 20A of the main oven 20, as described hereinafter. Optional secondary air intake vents 48 each having an adjustable damper may be provided, one in each common end wall 26 in selective communication with the opposed ends of the smaller diameter lower portion 20B of the main oven 20 to adjustably control air flow into each end of the lower portion of the main oven.

An interior divider wall 49 is disposed a distance inwardly from the rear end wall 33 of the longitudinal chamber 27 and extends angularly upward and rearward between the bottom of the longitudinal chamber and the rear portion of the arcuate side wall 40B the lower portion 20B of the main oven 20.

The firebox compartment 22 is defined by the bottom portion of the side wall 32 of the longitudinal chamber 27, the laterally spaced vertical side walls 36, and the angular interior divider wall 49 and the rear segments of the curved upper and lower side walls 40A and 40B of the main oven 20 disposed at its forward end. The top end of the firewall compartment 22 is open and covered by the underside of the griddle 25. A grate 50 removably supported in the firebox compartment 22 extends a distance inwardly from the rear wall 33 and curves upwardly adjacent to the interior divider wall 49. An ash removal door 51 is disposed in the bottom of the side wall 32 of the longitudinal chamber 27 beneath the grate 50.

As stated above, the laterally spaced vertical side walls 36 divide the generally cylindrical compartment 21 into a firebox compartment 22 at the center, and also form the inner facing walls of the laterally spaced smokeless ovens 23. Each smokeless oven 23 is a generally cylindrical flat bottom configuration having a side wall 52 of generally circular cross section joined at an inner facing end to a respective vertical side wall 36 and extending laterally outward therefrom with a top portion at its outer end joined to a respective common end wall 26. The lower portion of the side wall 52 terminates a short distance from the common end wall 26 and has a bottom segment removed. The outer end of each smokeless oven 23 is enclosed by generally circular end wall 53 having a flat bottom portion, which is disposed a short distance inwardly from the respective common end wall 26 to form a small passageway 54A therebetween. A slot 55 is provided in the upper portion of the side wall 52 extending between the end walls 53 and 26 in communication with the passageway 54A, and in communication with the underside of the griddle 25 (described hereinafter. The bottom of each smokeless oven 23 is enclosed by a flat bottom wall 56 that extends horizontally between the flat bottom of the end wall 53 and the laterally spaced vertical side wall 36 to define a space or passageway 54B beneath the bottom wall which is in fluid communication with the passageway 54A at the outer ends thereof. The passageways 54A and 54B form a passageway at the sides, bottom and end of each smokeless oven 23, which is in fluid communication with underside of the griddle 25 (described hereinafter). A food rack 57 is removably supported in each of the smokeless ovens 23.

A pair of bypass tubes 58, one on each side of the longitudinal chamber 27, are each secured at one end to the bottom of the curved side wall 37 of the generally cylindrical compartment 21 beneath the bottom wall 56 of the smokeless ovens 23, respectively, and extend a distance forwardly therefrom and then turn inwardly and their other end is secured to the side wall 32 of the longitudinal chamber 27 a distance forwardly of the main oven 20. The interiors of the bypass tubes 58 are in fluid communication with the passageways 54A and 54B at the ends and bottom of the smokeless ovens 23 and with the interior of the longitudinal chamber 27 through which smoke laden hot gas is evacuated the interior of the longitudinal chamber. An adjustable damper 59 is disposed in each bypass tube 58 to control flow through each bypass tube individually.

Figure 5:
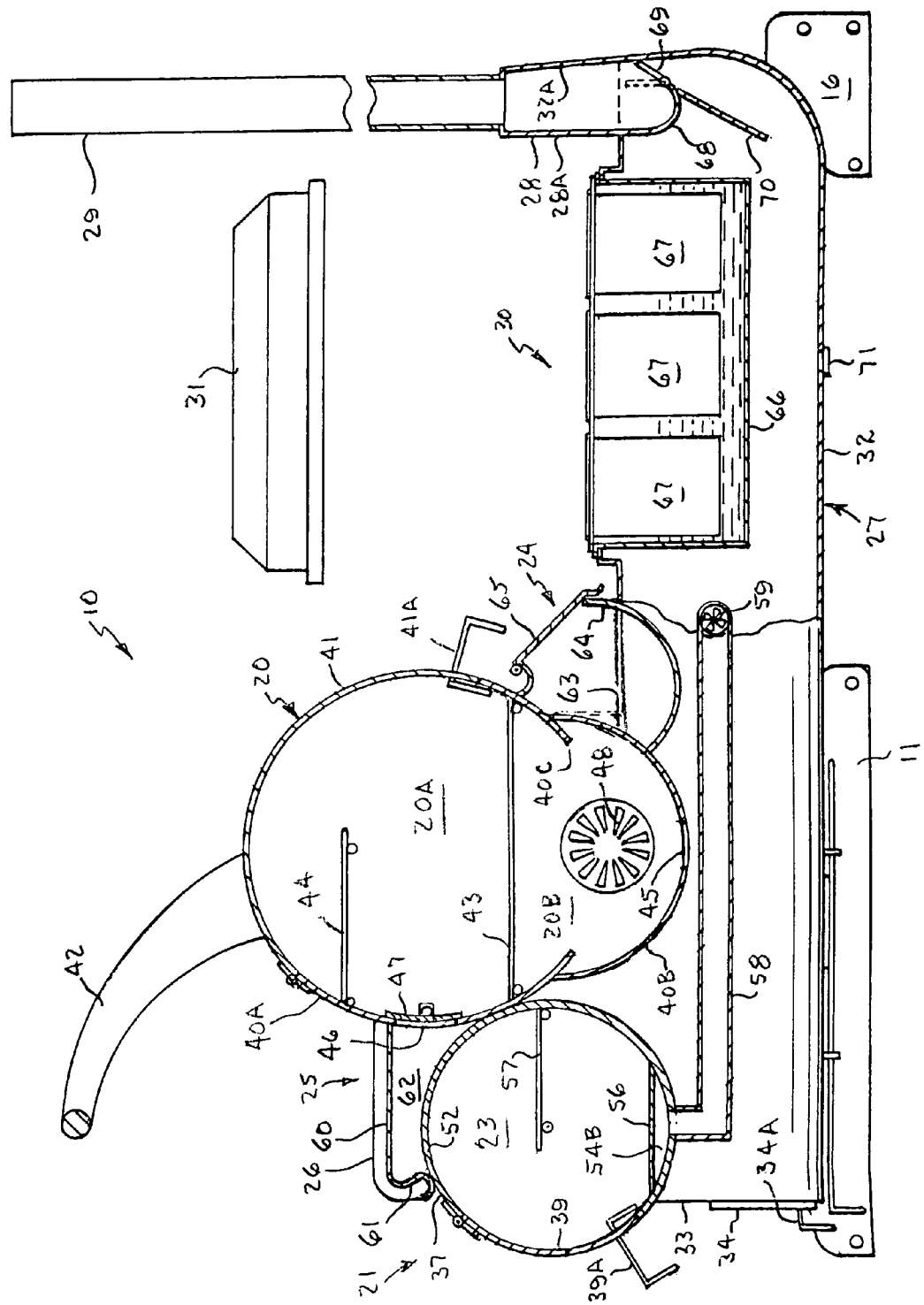
FIG. 5 is a longitudinal cross section through the cooker, taken along line 5—5 of FIG. 2, showing one of the smokeless ovens, one of the bypass tubes, and one of the dampers in the side wall of the main oven.

As best seen in FIGS. 4, 5 and 7, the griddle 25 has a flat generally rectangular horizontal top wall 60 secured along one longitudinal side to the exterior of the upper portion side wall 40A of the main oven 20 and an opposed short longitudinally extending vertical wall 61, J-shaped in cross section, that is secured at its lower end to the top of the side wall 37 of the generally cylindrical compartment 21. The underside of the horizontal top wall 60 is disposed a short distance above the open top end of the firebox compartment 22 and the top of the side walls 52 of the smokeless ovens 23 to form a space or passageway 62 between the underside of the griddle 25 and the exterior rear portion of the of the side wall 40A of the main oven 20 and top portions of the side wall 52 of the smokeless ovens 23, which is enclosed at its outer ends by the common end walls 26. The space or passageway 62 is in fluid communication with the open upper portion 22A of the firebox compartment 22, and with the laterally spaced small rectangular openings 46 in the upper portion side wall 40A of the of the main oven 20 near its outer ends. The J-shaped wall 61 of the griddle 25 forms a grease channel and the horizontal top wall 60 is disposed a short distance below the top of the common end walls 26 such that the common end walls channel grease to the J-shaped grease channel.

The warming compartment 24 has a generally rectangular horizontal bottom wall 63 secured along one longitudinal side to the exterior of the side wall 40B of the main oven 20 and a longitudinal front wall 64 that extends upwardly from the bottom wall in outwardly spaced relation to the main oven. The bottom wall 63 and front wall 64 of the warming compartment 24 are secured transversely in a cut away portion in the top of the side wall 32 of the longitudinal chamber 27 and the opposed outer ends of the warming compartment are enclosed by the common end walls 26. Thus, the interior of the warming compartment 24 is disposed in heat exchange relation with the interior of the central longitudinal chamber 27 and exterior of the main oven 20. The top end of the warming compartment 24 is covered by one or more hinged doors 65. The warming compartment 24 may be used for maintaining foods and liquid products in a warm condition, such as bread, buns, rolls, and various sauces and other liquids.

The steam table 30 includes a rectangular water pan 66 that is received and supported in a rectangular opening formed in the top wall of the side wall 32 of the longitudinal chamber 27, and a divider plate at the top end of the water pan has cutouts which receive conventional steam table trays or pans 67. The rectangular cover 31 covers the steam table 30. The rectangular water pan 66 is disposed in heat exchange relation with the interior of the longitudinal chamber 27.

The longitudinal chamber 27 extends a distance forwardly from the steam table 30 and adjoins the expansion chamber 28. The front end wall 32A of the longitudinal chamber 27 curves upwardly from the bottom of the side wall 32 and has an arcuate upper portion above the top of the longitudinal chamber that forms the front wall of the expansion chamber 28. The expansion chamber 28 has an arcuate back wall 28A above the top wall of the longitudinal chamber and a curved side wall adjoining the front and back walls. A generally J-shaped smoke shelf 68 extends downwardly into the interior of the longitudinal chamber 27 and terminates in an upwardly curved end a distance from the front wall 32A of the longitudinal chamber 27 that extends transversely across the interior of the chamber. The pair of parallel elongate tubular flues or stacks 29 are secured at their bottom ends to the curved side wall of the expansion chamber 28 in fluid communication with the interior of the expansion chamber and extend vertically upward therefrom.

An optional adjustable damper 69 may be pivotally mounted at the upturned end of the smoke shelf 68, which pivots between the smoke shelf and the front wall 32A to close off air flow between the interior of the longitudinal chamber 27 and interior of the expansion chamber 28 and stacks 29 in a fully closed position, and to allow air flow in an open position. A divider plate 70 extends angularly downward and rearward from the upturned end of the smoke shelf 68 and terminates a distance above the bottom of the longitudinal chamber side wall 32 and extends transversely across the interior of the longitudinal chamber 27, to define a restricted lower air passageway at the lower level of the longitudinal chamber. The divider plate 70 slows the evacuation of the hotter gases in the upper level of the longitudinal chamber 27 to facilitate more efficient heat exchange with the components.

OPERATION

The air draft and heat circulating systems of the present cooker operate on the principle of equalization of natural differential pressures caused by rising warmer air, similar to the draw created by the upper portion of a fireplace, for drafting hot gases or smoke laden hot gases from the combustion source and routing them through the various passageways into and around the various chambers to provide selective convection, radiant, or conduction cooking operations with or without smoke, or combinations thereof, using a single heat source.

Air Draft System

When the dampers 59 in the bypass tubes 58 are closed, and the dampers 47 at each end of the upper portion 20A of the main oven 20 are opened, outside air is drawn through the aperture or primary air vent 35 in the rear door 34 into the lower level 22B of the firebox compartment 22, between the smokeless ovens 23 and through the open top end of the firebox compartment into the space or passageway 62 beneath the griddle 25.

The smoke laden hot gas or hot gas created by the combustion of the burning fuel source (wood or charcoal) is drawn laterally outward through the passageway 62 under the griddle 25 to each side, over the smokeless ovens 23 to the full width of the main oven exterior and enter the upper portion 20A of the main oven 20 at each end through the openings 46 in its upper side wall 40A. The streams of hot gases or smoke laden hot gases entering at each end of the upper portion 20A of the main oven 20 swirl around and toward the center of the main oven and exit out the hole 45 in the bottom of the lower portion 20B of the main oven. The hot gases or smoke laden hot gases exiting the hole 45 enter the interior of the central longitudinal chamber 27, travel under the full length of the water pan 66 of the steam table 30, under the divider plate 70, and up into the expansion chamber 28 above the smoke shelf 68 and are drawn through the flues or stacks 29 exiting at their top ends. Drawing air though the source of combustion allows for a much smaller fire that creates a greater heat. If provided, the damper 69 in the expansion chamber 28 may be adjusted to control the amount of air drawn into the system.

Alternatively, the dampers 59 in the bypass tubes 58 may be opened and the dampers 47 in the side wall 40B of the main oven 20 closed, whereby the hot gases or smoke laden hot gases do not enter the main oven, but instead are drawn around the exterior of the smokeless ovens 23, through the passageways 54A and 54B, and though the bypass tubes beneath the bottom of the smokeless ovens, thereby bypassing the main oven, and enter the longitudinal chamber 27 forward of the main oven and then travel under the full length of the water pan 66 of the steam table 30, under the divider plate 70, and up into the expansion chamber 28 above the smoke shelf 68 and exit through the flues or stacks 29.

Heat Flow Through The Cooker

The firebox compartment 22 is located in the center of the cooker 10 thus requiring minimum travel distances and providing maximum efficiency of the heat created by the combustion source. The smokeless ovens 23 are located on each side of the firebox compartment 22 and are heated on their inner facing end, across their tops, around their outer ends, and under their bottoms. The griddle 25 is located directly above the firebox compartment 22 and is heated from heat radiated from the fire below. The upper portion side wall 40A of the main oven 20 is pre-heated by the hot gases that pass through the passageway 62 beneath the griddle 25 and along the length of the side wall in a plane disposed at approximately its central horizontal axis. The hot gases or smoke laden hot gases entering at each end of the upper portion 20A of the main oven 20 through the openings 46 and open dampers 47 in its side wall swirl around and back toward the center of the main oven and exit out the hole 45 in the bottom of the lower portion 20B of the main oven.

The hot gases or smoke laden hot gases inside the main oven 20 are caused to swirl because one side of the exterior surface of the main oven is pre-heated by the hot gases or smoke laden hot gases directed along it's length and the heat is radiated primarily from one side of the oven toward the interior of the main oven upper portion 20A at approximately it's central horizontal axis, and then rises inside the oven, thus, the hot gases or smoke laden hot gases entering at each end of the main oven is caused to rise and swirl about the longitudinal axis of its arcuate upper portion 20A and is drawn toward the center of the oven as it exits the central hole 45 in its lower portion. This feature creates a more even distribution of heat within the oven as the swirling hot gasses pass over and around the items being cooked inside. Food in the main oven is cooked both by convection heat as the swirling hot gases or smoke laden hot gases pass over and around the food, and by radiant heat radiated from the heated side wall.

The hot gases or smoke laden hot gases are then are drawn through the longitudinal chamber 27 under and around the steam table water pan 66, and up into the expansion chamber 28 where it is drawn out through the stacks 29. The exiting of the hot gases or smoke laden hot gases from the bottom the main oven 20 maintains a higher moisture level, and the distance traveled under the water pan 66 of the steam table 30 reduces the temperature of the smoke laden hot gasses causing condensation. This allows for an even higher level of moisture. Condensation may be removed through a drain hole and removable plug 71 in the bottom of the longitudinal chamber 27.

The swirling smoke laden hot gasses allow the main oven 20 to be used as a smoking roaster. Alternatively, the main oven 20 may be used as a charcoal broiler or grill by placing charcoal in a tray under the gridiron 43. Heat radiates up when working with the door 41 open, but when the door is closed the same draft system will draw the heat to the center and under the water pan 66 of the steam table 30.

Varying Heat Level System

The primary air vent 35 at the entrance of the firebox compartment 22 is always open for supplying oxygen to the source of combustion. The two laterally spaced dampers 47 on the side wall 40A of the upper portion 20A of the main oven 20 near each end can be adjusted to vary the temperature level in each end portion of the main oven and also the temperature in the smokeless ovens 23. Slightly closing the damper at one end will reduce the temperature in that end of the main oven. This also reduces the temperature in the smokeless oven 23 on that side of the firebox compartment 22. Adjusting the dampers 47 allows a change of temperature at respective ends for cooking of different food items placed near each end at different temperatures. Thus, different food items requiring different temperatures may be cooked at the same time without having to move or relocate the items or starving the fire. The temperature in the smokeless ovens 23 on each side of the firebox compartment 22 can also be increased or adjusted independently of one another by the dampers 59 in the bypass tubes 58 whereby different items requiring different temperatures may be cooked in each smokeless oven at the same time. If provided, the two air intake vents 48 located in the lower portion 20B of the main oven at each outer end below the gridiron 43 can also be adjusted independently of one another to control the temperature at each end of the gridiron whereby different items requiring different temperatures may be placed near the opposed ends and cooked at the same time. The optional damper 69 in the expansion chamber 28 may be provided to regulate the amount of draw throughout the entire system. When this damper is opened, the amount of draft through the cooker increases. This also can increase the temperature of all of the cooking areas. If the damper 69 is closed completely, the flow of smoke laden hot gasses stop and the fire will begin to starve for oxygen and die down.

The Griddle

The griddle 25 located just above the firebox compartment 22 and extending the entire width of the cooker is preferably made of stainless steel and is heated by the hot gases or smoke laden hot gases from the firebox received on its underside and directed laterally outward along its length toward the laterally spaced openings 46 near the ends of the main oven 20. Thus, the griddle 25 may be selectively used for cooking food and containerized liquid items by conductive heat transfer, for example frying eggs, cooking bacon, making pancakes or boiling beans, and conductive cooking thereon may be selectively carried out while cooking other food items in the main oven and/or in the smokeless ovens.

Smokeless Ovens

The two smokeless ovens 23 located on each side of the firebox compartment 22 have no air transfer through their interior and the food therein is cooked by smokeless radiant heat. If needed, one oven can be regulated to be hotter than the other oven, as described above. They can be utilized for baking almost anything from cookies, biscuits, breads, rolls, pies, potatoes and even dry roasting corn. A pan of water can be placed in the bottom of the smokeless oven(s) if a moist heat is needed for tenderizing meats or steaming vegetables. In a preferred embodiment, all the doors are sized and location of food racks are disposed to accommodate commercial pans that may also be used on the griddle 25 and/or fit in the steam table 30.

Smoke Roasting in the Main Oven

One of the important utilitarian features of the present cooker is its ability to spiral smoke through the main oven 20. Like a convection oven, the items within the main oven rarely have to be turned or moved about to achieve even distribution of heat and smoke. The temperature can be regulated from end to end and to the point of no flow at all if needed. This form of roasting in smoke takes the work out of smoker cooking.

Charcoal Broiling or Grilling in the Main Oven

Another important feature of the present cooker is that the combustion source is remote from the food items being cooked. The main oven 20 may be used for charcoal broiling or grilling by placing a tray of charcoal under or on the grate 50 in the firebox compartment 22. When the dampers 47 are fully open, and charcoal is used in the firebox compartment 22, a steak can be seared and cooked indirectly with no flair ups or grease fires.

Steam Table

Another important feature of the present cooker is the steam table 30, which can be used to keep cooked food warm until served, and can be used to serve warm food cafeteria style.

Warming Compartment

The warming compartment 24 can be used to keep cooked food warm until served, for example: cookies, biscuits, breads, rolls, pies, cookies, potatoes, etc., that have been prepared in the smokeless ovens. It can also be used for maintaining liquid products in a warm condition, such as various sauces and other liquids or beverages.

While this invention has been described fully and completely with special emphasis upon preferred embodiments, it should be understood that within the scope of the appended claims the invention may be practiced otherwise than as specifically described herein.

The invention claimed is:

1. An outdoor multi-method cooking apparatus for cooking and smoking food through the medium of circulated heat and hot gases or smoke laden hot gases, comprising in combination:
   a central horizontally disposed elongate longitudinal chamber having a side wall of curvilinear cross section defining an interior extending along a longitudinal axis;
   a firebox compartment having a lower portion within a first end of said longitudinal chamber isolated from said chamber interior adapted to contain combustible materials for providing heat, hot gases or smoke laden hot gases and having an access door, a primary air inlet, and an open upper end;
   at least one vertical flue stack at a second end having an interior in fluid communication with said longitudinal chamber interior and said primary air inlet through which heat, hot gases or smoke laden hot gases are vented outward from said longitudinal chamber;
   a generally cylindrical main oven having a side wall of curvilinear cross section with an arcuate upper portion extending along a longitudinal axis transverse to the longitudinal axis of said longitudinal chamber having one side disposed in heat exchange relation with said firebox compartment open upper end and an adjoining arcuate lower portion isolated from said firebox compartment and enclosed outer ends defining an interior cooking chamber having an arcuate upper portion and an arcuate lower portion, an access door in said arcuate upper portion, and at least one removable rack in said cooking chamber for supporting food to be cooked;
   first and second laterally spaced inlet openings in said main oven side wall arcuate upper portion near said outer ends, respectively, including adjustable damper means for regulating the passage of hot gases or smoke laden hot gases therethrough, and a central outlet opening in said arcuate lower portion in fluid communication with said longitudinal chamber interior;
   a generally rectangular griddle formed of metal having a horizontal top surface with a longitudinal side secured to said arcuate upper portion of said main oven side wall above said laterally spaced first and second inlet openings and extending outwardly therefrom above said firebox compartment open upper end and having an outer depending longitudinal side wall and laterally opposed end walls configured to receive heat and hot gases or smoke laden hot gases from said firebox compartment open upper end and direct it onto said one side of said main oven side wall arcuate upper portion and laterally outward therealong toward said laterally spaced first and second inlet openings, and its said horizontal top surface being heated thereby;
   said adjustable damper means in an open position allowing heat and hot gases or smoke laden hot gases directed onto and along said main oven side wall arcuate upper portion to pass through said laterally spaced first and second inlet openings in said main oven side wall upper portion air chamber arcuate upper portion, through said central outlet opening in its said arcuate lower portion, through said longitudinal chamber interior to said second end, and vented outward thereof through said flue stack;
   said one side of said main oven side wall arcuate upper portion being preheated by the hot gases or smoke laden hot gases directed therealong, and the heat radiated primarily through said one side of said arcuate upper portion into said interior cooking chamber arcuate upper portion and then rising within said arcuate upper portion causing the hot gases or smoke laden hot gases entering through said laterally spaced inlet openings to swirl about the longitudinal axis of said arcuate upper portion and toward the center of said cooking chamber as they pass through said central outlet opening in its said arcuate lower portion to substantially evenly distribute the heat and hot gases or smoke laden hot gases within said main oven cooking chamber; wherein
   food supported on said rack in said main oven cooking interior chamber is cooked both by convection heat as the swirling hot gases or smoke laden hot gases pass over and around the food and by the radiant heat radiated through said heated side wall arcuate upper portion and
   food items and containerized liquid items supported on said griddle top surface are heated or cooked by conductive heat transfer.

2. The outdoor multi-method cooking apparatus, according to claim 1, wherein
   each of said damper means associated with said first and second laterally spaced inlet openings in said main oven side wall arcuate upper portion is independently adjustable to allow adjustment of each of said first and second inlet openings relative to the other to selectively allow passage of different amounts of hot gases or smoke laden hot gases into the interior of said main oven cooking chamber at either end thereof and thereby provide different temperatures at opposed end portions of said interior cooking chamber to cook different food items requiring different temperatures at the same time without having to move or relocate the items.

3. The outdoor multi-method cooking apparatus, according to claim 1, further comprising:
   a pair of individually adjustable secondary air inlets, one disposed on a respective one of said main oven enclosed outer ends in fluid communication with said cooking chamber including adjustable damper means for regulating the passage of exterior air drawn into said cooking chamber for selectively controlling the temperature level at each opposed end of said cooking chamber to allow cooking of different food items requiring different cooking temperatures placed near a respective end to be cooked simultaneously without relocating the food items.

4. The outdoor multi-method cooking apparatus, according to claim 1, further comprising:
   a pair of generally cylindrical smokeless ovens one disposed on each side of said firebox upper portion in laterally opposed relation, each having a first end wall disposed in heat exchange relation with said firebox compartment, a side wall and bottom wall of curvilinear cross section extending outwardly therefrom and an enclosed outer end defining an interior smokeless cooking chamber, a bypass passageway extending along said enclosed outer end and beneath said bottom wall in heat exchange relation with said smokeless cooking chamber and isolated from fluid communication therewith, an access door in said side wall, and a removable rack in said smokeless cooking chamber for supporting food to be cooked;
   said griddle horizontal top wall and longitudinal side secured to said arcuate upper portion of said main oven side wall above said laterally spaced first and second inlet openings and extending outwardly therefrom above said firebox compartment and an upper segment of each said smokeless oven side wall, and its said outer depending longitudinal side wall and laterally opposed end walls adjoined to said firebox compartment and said upper segment of each said smokeless oven side wall to define a longitudinally extending passageway in fluid communication with said upper segment of each said smokeless oven side wall and said bypass passageway extending along said enclosed outer end and beneath said bottom wall of each said smokeless cooking chamber; and a pair of bypass conduits exterior of said longitudinal chamber, each connected at a first end in fluid communication with a respective said bypass passageway and at second end with said interior of said longitudinal chamber, including adjustable bypass air damper means for regulating the passage of fluid therethrough;

said adjustable damper means in a closed position preventing heat and hot gases or smoke laden hot gases from passing through said laterally spaced first and second inlet openings and both of said bypass air damper means in an open position allowing heat and hot gases or smoke laden hot gases directed onto and along said main oven side wall arcuate upper portion to pass through said longitudinally extending passageway, along said upper segment of each said smokeless oven side wall, through said bypass passageway along said enclosed outer end and beneath said bottom wall of each said smokeless cooking chamber, through said bypass conduits, and through said longitudinal chamber interior, and vented outward therefrom through said flue stack; whereby said side wall of each of said smokeless ovens is heated by the heat and hot gases or smoke laden hot gases passing through said longitudinally extending passageway and said bypass passageway, and the heat is radiated into the interior of each said smokeless cooking chamber, thereby creating substantially even distribution of heat within said smokeless cooking chambers, and the food supported on said rack therein is cooked by smokeless radiant heat.

5. The outdoor multi-method cooking apparatus, according to claim 4, wherein each of said bypass damper means is independently adjustable to allow adjustment of each relative to the other to selectively allow passage of different amounts of gases or smoke laden hot gases to be drawn through the respective said longitudinally extending passageway and said bypass passageway into said longitudinal chamber interior and thereby provide different temperatures in each of said smokeless cooking chambers to cook different food items requiring different temperatures at the same time without having to move or relocate the items.

6. The outdoor multi-method cooking apparatus, according to claim 4, wherein each of said damper means associated with said first and second laterally spaced inlet openings in said main oven side wall arcuate upper portion is independently adjustable to allow adjustment of each of said first and second inlet openings relative to the other to selectively allow passage of different amounts of hot gases or smoke laden hot gases through the respective said longitudinally extending passageway along said upper segment of each said smokeless oven side wall, through said bypass passageway along said enclosed outer end and beneath said bottom wall of each said smokeless cooking chamber, and through said bypass conduits, respectively, to selectively regulate the temperature in each of said smokeless cooking chambers individually to allow smokeless cooking of different food items requiring different temperatures at the same time.

7. The outdoor multi-method cooking apparatus, according to claim 1, further comprising:

a warming compartment having a longitudinal side wall of curvilinear cross section disposed in heat exchange relation with said longitudinal chamber interior and a longitudinal side adjoined to an outer side of said main oven arcuate lower portion defining a warming chamber and an access door on said warming compartment side wall;

said warming chamber heated by the radiant heat of said main oven arcuate lower portion and the hot gases or smoke laden hot gases passing through said longitudinal chamber interior, and food and liquid products therein are maintained in a warm condition.

8. The outdoor multi-method cooking apparatus, according to claim 1, further comprising:

a steam table on an upper portion of said longitudinal chamber having a generally rectangular water pan disposed in heat exchange relation with said longitudinal chamber interior for containing a quantity of water, and a plate at the top end of said water pan having apertures in which smaller pans are removably supported with their lower ends partially submerged in the water;

said water pan and water contained therein being heated by the hot gases or smoke laden hot gases passing through said longitudinal chamber interior, and food and liquid products in said smaller pans maintained in a warm condition by the heated water.

9. The outdoor multi-method cooking apparatus, according to claim 1, further comprising:

adjustable flue control damper means disposed at said second end adjacent to said at least one vertical flue stack for controlling the venting of hot gases or smoke laden hot gases through said at least one vertical flue stack interior.

10. The outdoor multi-method cooking apparatus, according to claim 1, further comprising:

an expansion chamber at said longitudinal chamber second end disposed in fluid communication between said longitudinal chamber and said interior of said at least one vertical flue stack.

11. The outdoor multi-method cooking apparatus, according to claim 1, further comprising:

a generally J-shaped smoke shelf in said longitudinal chamber interior at said second end adjacent to said at least on vertical flue stack.

12. The outdoor multi-method cooking apparatus, according to claim 11, further comprising:

a divider plate in said longitudinal chamber interior at said second end extending angularly downwardly from said smoke shelf and terminating a distance above the bottom of said chamber interior to define a restricted lower passageway at a lower level of said longitudinal chamber interior and slow the evacuation of hotter gases or smoke laden hot gases in an upper level of said longitudinal chamber and facilitate more efficient heat exchange therein.

* * * * *